US008300639B2

(12) United States Patent
Bisdikian

(10) Patent No.: US 8,300,639 B2
(45) Date of Patent: Oct. 30, 2012

(54) FORWARDING GROUPS OF MULTICAST FLOWS

(75) Inventor: Chatschik Bisdikian, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/543,120

(22) Filed: Aug. 18, 2009

(65) Prior Publication Data
US 2010/0098078 A1    Apr. 22, 2010

Related U.S. Application Data

(62) Division of application No. 11/495,103, filed on Jul. 28, 2006, now abandoned.

(51) Int. Cl.
H04L 12/28 (2006.01)
(52) U.S. Cl. ......................... 370/390; 370/432
(58) Field of Classification Search .......... 370/389–392, 370/432
See application file for complete search history.

(56) References Cited

U.S. PATENT DOCUMENTS

| 5,309,430 | A  | * | 5/1994  | Verhille et al. | 370/397 |
| 5,751,971 | A  | * | 5/1998  | Dobbins et al. | 709/238 |
| 5,949,784 | A  | * | 9/1999  | Sodder | 370/432 |
| 6,331,983 | B1 | * | 12/2001 | Haggerty et al. | 370/432 |
| 6,795,433 | B1 | * | 9/2004  | Li | 370/392 |
| 6,934,260 | B1 | * | 8/2005  | Kanuri | 370/389 |
| 6,947,434 | B2 |   | 9/2005  | Hundscheidt et al. | |
| 7,065,268 | B2 | * | 6/2006  | Prairie et al. | 370/249 |
| 7,302,482 | B2 | * | 11/2007 | Rodosek et al. | 370/252 |
| 2004/0184454 | A1 | * | 9/2004 | Shankar et al. | 370/390 |
| 2004/0202164 | A1 | * | 10/2004 | Hooper et al. | 370/390 |
| 2004/0252690 | A1 | * | 12/2004 | Pung et al. | 370/390 |
| 2004/0258066 | A1 |   | 12/2004 | Chen et al. | |
| 2006/0221975 | A1 | * | 10/2006 | Lo et al. | 370/390 |
| 2007/0076698 | A1 | * | 4/2007  | Matsumoto | 370/352 |

OTHER PUBLICATIONS

Ion Stoica et al., "Reunite: A Recursive Unicast Approach to Multicast", IEEE INFOCOM 2000' pp. 1644-1653; 2000.
David Thaler et al., "On The Aggregatability of Multicast Forwarding Stale", IEEE INFOCOM 2000' pp. 1654-1663; 2000.
Aditya Ganjam et al., "Internet Multicast Video Delivery", IEEE 2005; pp. 159-170; 2005.

* cited by examiner

*Primary Examiner* — Steven H Nguyen
(74) *Attorney, Agent, or Firm* — Tutunjian & Bitetto, P.C.; Brian P. Verminski

(57) ABSTRACT

A routing element and method for forwarding multicast traffic in a network includes grouping a collection of path-related multicast information flows from a source and associating each information flow of the collection with a multicast address from a set of multicast addresses. Forwarding information is placed in routers within the network between the sources and destinations wherein the forwarding information includes a single entry in a forwarding table using an identifier, e.g., a representative address, for the collection.

12 Claims, 8 Drawing Sheets

{(*,G1) and (*,G2) can be aggregated (*,G3) and (*,G4) can be represented as usual

FORWARDING GROUPS OF MULTICAST FLOWS

RELATED APPLICATION INFORMATION

This application is a Divisional application of U.S. patent application Ser. No. 11/495,103 filed on Jul. 28, 2006 now abandoned, incorporated herein by reference in its entirety.

GOVERNMENT RIGHTS

This invention was made with Government support under Contract No.: FA8808-04-C-0022 awarded by the Air Force. The Government has certain rights in this invention.

BACKGROUND

1. Technical Field

The present invention relates to network communications and more particularly to encoding multicast addresses in a multicast forwarding table for reducing the size of the table.

2. Description of the Related Art

Sizes of forwarding tables in routers in a network that supports multicast increases at least linearly with the number of multicast groups served in the network (at least one new entry is added in the forwarding table for each new multicast group). With the increase of multicast applications in the Internet, this issue poses a considerable scalability issue for the forwarding tables. Few proposals have focused on solving this problem, since solutions rely on fundamentally changing the multicast protocols and architectures that have long been established.

SUMMARY

A routing element and method for forwarding multicast traffic in a network includes grouping a collection of path-related multicast information flows from a source and associating each information flow of the collection with a multicast address from a set of multicast addresses. Forwarding information is placed in routers within the network between the sources and destinations wherein the forwarding information includes a single entry in a forwarding table using an identifier, e.g., a representative address, for the collection.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
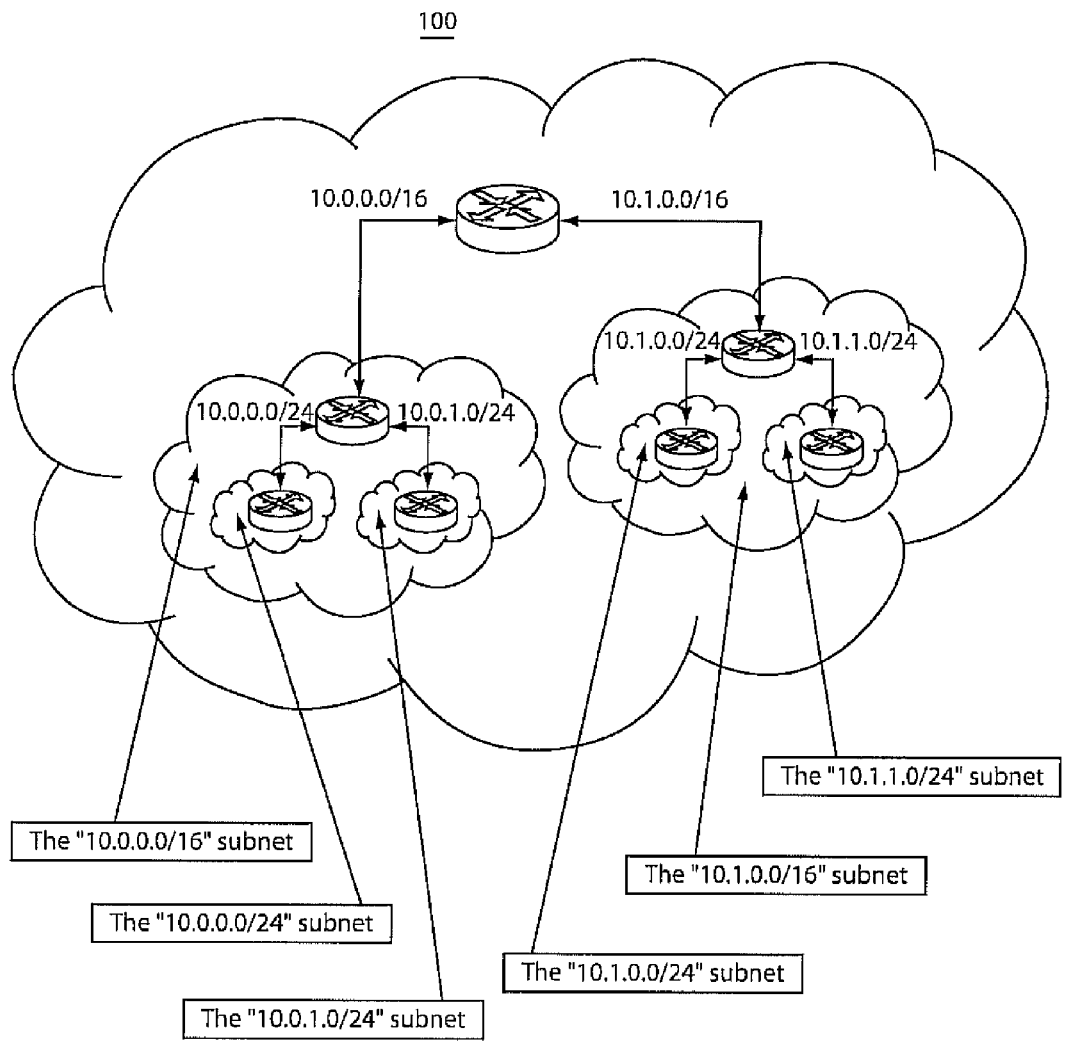
FIG. 1 is a schematic diagram showing a hierarchical structure of nets and subnets based upon addresses.

A single entry for a unicast forwarding table may represent a large collection of end-devices. This is possible because a unicast address is reflective of the hierarchical structure/topology of the Internet. However, this is impossible with multicast addresses which bear no relationship with the network topology. This results in a non-scalable way to organize multicast forwarding tables with each entry of the multicast table associating with only one multicast address.

Present principles improve the scalability issue by grouping multicast flows thematically and permitting a single entry in the forwarding table to represent all the multicast flows that share the same theme.

In one embodiment, a method for encoding multicast addresses in a multicast forwarding table for reducing the size of the table is provided. According to the method, multicast transmissions of related traffic flows are grouped together and only an identifier (e.g., a representative address) for the whole group is encoded in the forwarding table. This scheme is constructed around the (S,G)-centric model, and newly upgraded and legacy routers can coexist and interoperate within the same network. Note the following notation may be employed (S,G), where the multicast group address is G and source address is S. Also, the notation (*,G) is used to denote multicast transmissions for which their source is of no concern.

Embodiments of the present invention can take the form of an entirely hardware embodiment, an entirely software embodiment or an embodiment including both hardware and software elements. In a preferred embodiment, the present invention is implemented in a combination of hardware and software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

With the increase of multimedia content distribution applications, like Internet-based radio and TV, support for network-based multicast has also been increasing. With network-based multicast, a multicast packet entering a router through an input interface (iif) is replicated and transmitted through a list of output interfaces (oif) destined toward network segments with listeners interested in the multicast transmissions.

When unicast packets (which have a single source and a single destination) enter a router, the router looks at the destination IP address in the packet and then does an address look-up in its forwarding table to find out through which oifs the packets need to be forwarded. The forwarding table organizes the destination addresses in it into ranges representing subnets that can be reached through a specific oif. This creates a highly scalable, hierarchical structure of addresses facilitating the efficient encoding of unicast IP addresses within a forwarding table.

Referring now to the drawings in which like numerals represent the same or similar elements and initially to FIG. 1, a highly scalable, hierarchical structure of addresses 100 is illustratively shown. Destination addresses represent subnets that can be reached through a specific oif. The subnets can be searched very efficiently and occupy relatively small space in a router's forwarding table. While there are millions upon millions of host nodes on the Internet, even the largest routers on the public Internet have forwarding tables that are many orders of magnitude smaller (hardly above 150,000 entries).

The assignment of unicast addresses is performed in a hierarchical fashion from big networks to smaller networks (or, subnets) within the big networks, thus, a unicast address represents a physical location for a host on the Internet. Unfortunately, this is not true with the assignment of multicast addresses. Because the listeners of multicast transmissions can be anywhere on the Internet, the assignment of a multicast address does not and cannot represent any physical or logical location of the listeners e.g., multicast addresses are assigned from a relative flat multicast address space.

Figure 2:
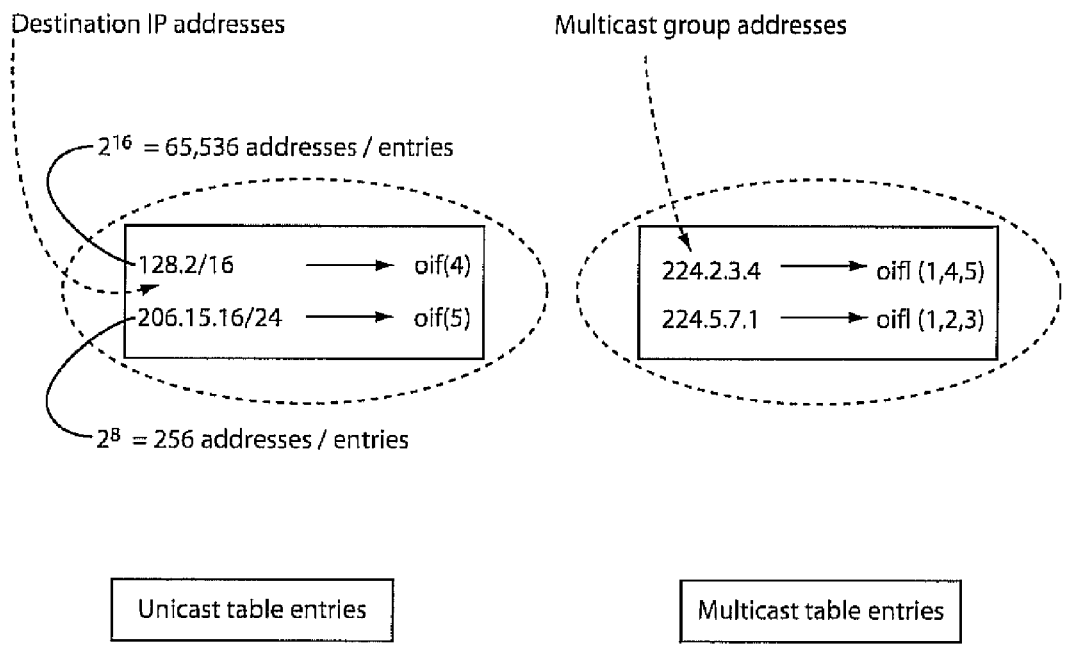
FIG. 2 is a diagram showing a comparison between unicast and multicast table entries.

As a result, while a single entry in a unicast forwarding table may relate to thousands or more of unicast addresses, each entry in a multicast forwarding table relates to one and only one multicast group as depicted in FIG. 2, where "oifl" stands for outgoing interface list. This is a non-scalable situation that, as the number of multicast applications increases, will cause poor utilization of the router resources.

Since, the underlying network topology cannot be exploited in assigning multicast addresses, a different approach is needed to manage the increase in forwarding multicast states. For one thing, it would be desirable not to alter the fundamental way multicast addresses are allocated, e.g., introduce a hierarchical multicast address structure, as this will impact severely how hosts and routers on the Internet operate. Instead, the present principles provide that multicast group addresses be assigned (for example, in ranges) based on "thematic" properties of the multicast transmissions.

By thematic properties it is meant that the multicast listeners in a collection of two or more multicast groups and the applications that they are listening to share a common theme that could be potentially of interest/desirable to all the listeners in all the multicast groups in the collection. Therefore, all the multicast flows associated with a group of thematically assigned addresses can be switched in unison, and hence there is no need for all the individual multicast addresses in the group to appear in the forwarding table.

Figure 3:
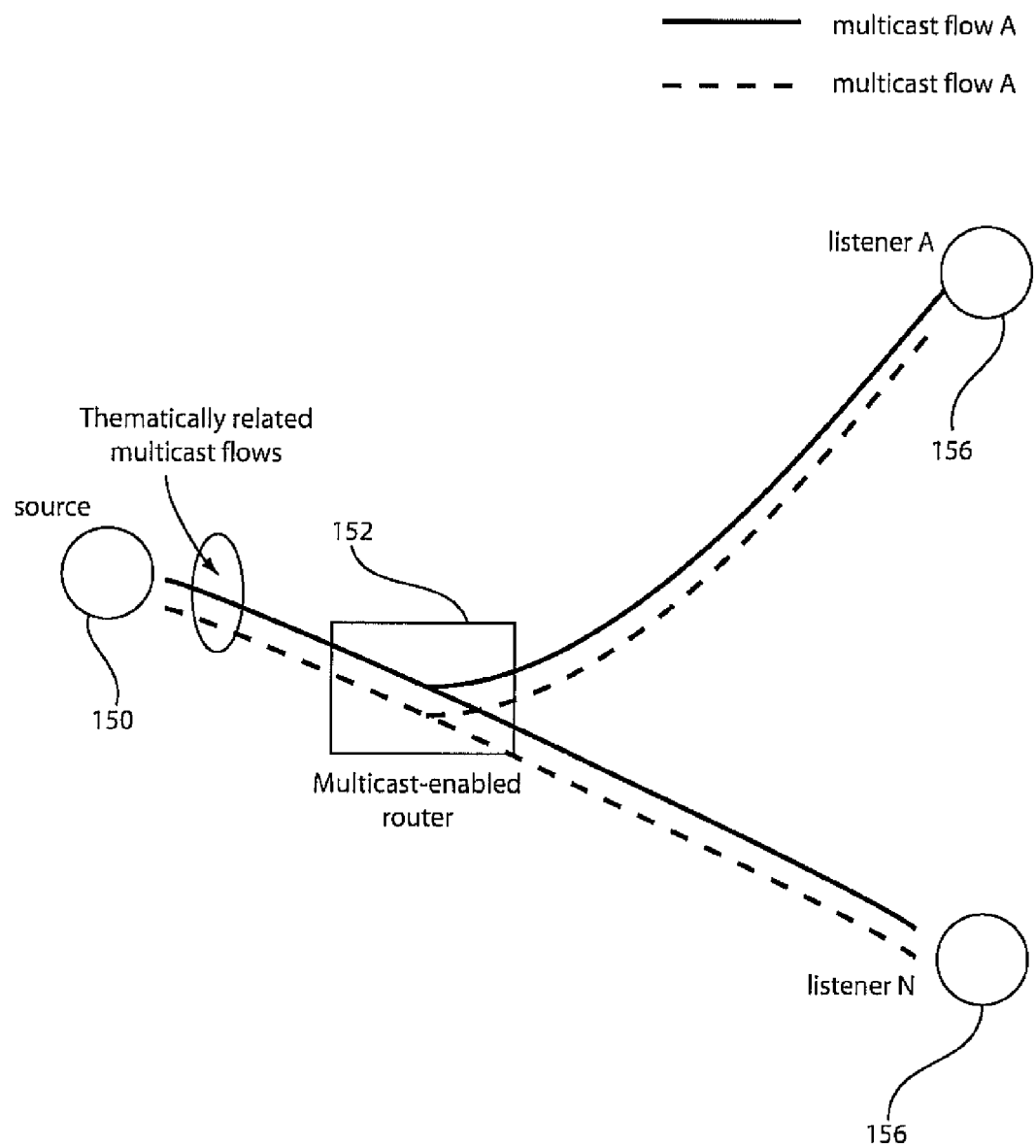
FIG. 3 is a conceptual diagram showing a multicast-enabled router combining multicast flows in accordance with one embodiment.

Referring to FIG. 3, a schematic diagram shows a concept for thematically assigning addresses. A source 150 provides content to a multicast-enabled router 152 in the form of two multicast flows A and B. The multicast flow are addressed to a same or similar set of listeners 156 and are therefore routed in accordance with the thematically related aspect of the flows.

Such a common thematic property can be exploited in multicast applications that carry multimedia traffic. Multimedia content may be encoded (and later on transmitted) hierarchically in multiple streams, with additional streams adding finer detail to the content on top of what has already been achieved. Alternatively, the individual components of the multimedia content (e.g., audio, video, text, etc.) may be transmitted in its own separate stream (or collection of hierarchically again encoded streams). In both cases, the multiple streams, whose collection constitutes the multimedia content, utilize their own flow, and each flow can be assigned its own multicast address. Such encodings of multimedia streams permit a rich collection of personal end-devices that have a wide range of playback capabilities to choose which of the streams to play at each moment. For example, a user of a high-end personal digital assistant (PDA) that participates on an on-line videoconference may decide to play just the audio feed momentarily to reduce the burden on the PDA resources while the user tends to some other activities on the PDA.

Groups of related multicast traffic flows (flows A and B) may flow in parallel along similar paths from source 150 to destinations 156. In this case, the listener relationship of these traffic flows can be exploited and therefore the corresponding multicast groups can be "tied" together and represented by a single identifier in a forwarding table. One way to tie the multicast groups together and identify the multicast groups by a single identifier is to assign the flows in ranges of successive addresses for all flows that are so related. In this case, for example, the entry for 224.5.7.0/28 in the forwarding table in a router will represent a group of 16 multicast addresses starting with address 224.5.7.0 all of which can be replicated and forwarded in similar fashion by the router.

Multicast addresses may be assigned according to some "property" other than the physical location of a host on the network. In one embodiment, this property exploits the relationship between the content streams. The property takes advantage of the "content topology" rather than location topology. The idea can be further generalized to consider flow relationships beyond the relationship of multiple content streams that are inherent in a multimedia stream. Multiple streams may relate in some way with each other, for example, a data application may comprise two multicast data streams, none of which is inherently a multimedia stream, e.g., a stock application that multicasts stock quotes of the companies in the Dow Jones index and another of the companies in the S&P 500 index. Addresses can be assigned to these streams directly or indirectly. In the latter case, a multicast routing pointer could be assigned to the streams, with the requirement that all data flows having the same multicast routing pointer are forwarded in the same way. This in turn permits multicast forwarding tables to utilize their resources efficiently, and reduces the size of their multicast forwarding table by using a "proxy" representing all of the related multicast flows (the proxy could be either a representative multicast address or a pointer to it).

Figure 4:
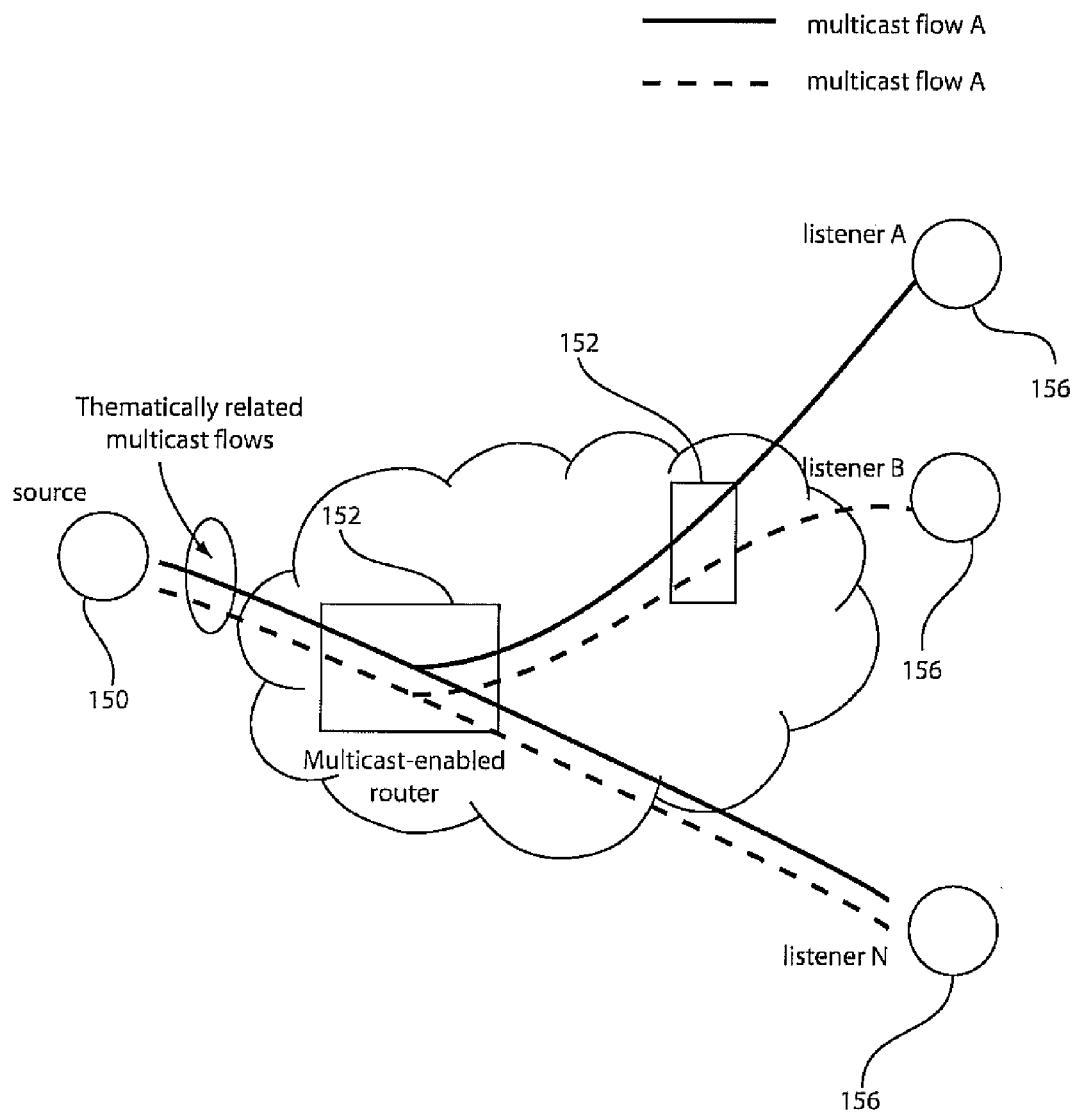
FIG. 4 is a conceptual diagram showing a plurality of multicast-enabled routers combining multicast flows and tailoring a delivery of portion of a multicast flow in accordance with another embodiment.

Referring to FIG. 4, an end-to-end case is illustratively depicted where thematically related multicast flows A and B may switch in unison in only a portion of the paths between a multicast source 150 and its listeners 156. In this case, maximum state reduction will be experienced by the core network routers as compared with the routers at the network edges close to the multicast listeners. However, this does not diminish the effectiveness of the present principles as it is the core routers who suffer the most from the state increase and, hence, it is more significant to reduce the state in these routers rather the ones at the edge.

In the broadest sense, those multicast flows that share portions of a multicast distribution tree from its root to some branching point will be referred to as path-related multicast traffic flows. These flows can then be assigned associated multicast addresses (e.g., in sequence), and the routers along the multicast tree can use identifiers, e.g., representative addresses, to represent collections of the multicast addresses as described above.

Figure 5:
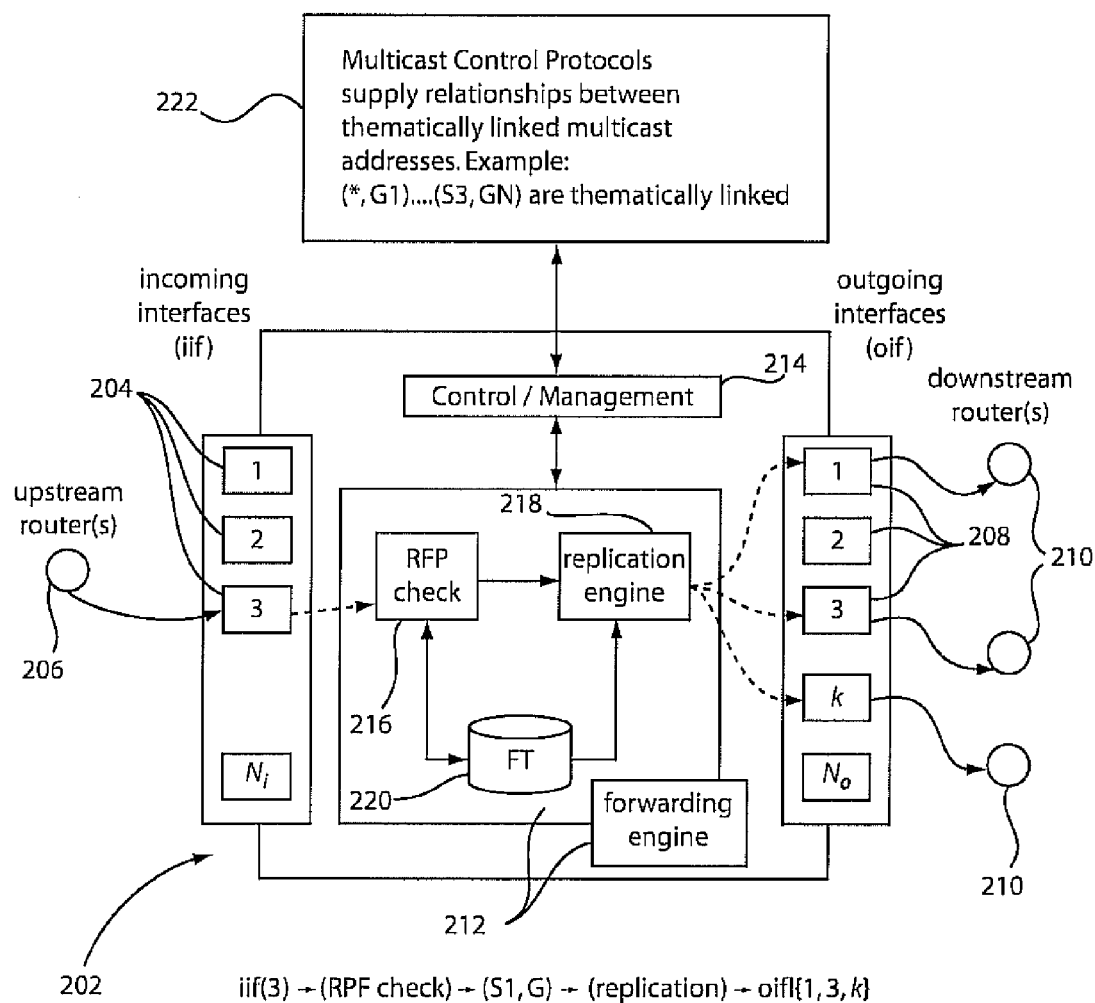
FIG. 5 is a block diagram showing a routing element employed to handle multicast group routing of multicast flows in accordance with an illustrative embodiment.

Referring to FIG. 5, one embodiment is shown as applied to current de facto Internet standards for multicasting, e.g., PIM-SM. Main components of a router 202 are shown, including the iifs 204 that receive transmissions from upstream routers 206 (i.e., the routers closer to a source 150), oifs 208 that send transmissions to downstream routers 210 (i.e., the routers closer to the listeners 156), a multicast forwarding engine 212, and control/management modules 214. The router may have many iifs 204 and oifs 208. In forwarding a multicast packet, the forwarding engine 212 will first check if the packet has arrived on the right iif 204 by employing a reverse path forwarding (RPF) module 216. If the RPF check 216 checks, then the packet is replicated by a replication engine 218 and scheduled for transmission to all the oifs 208 along the path(s) to listeners interested in this transmission via downstream routers 210.

During forwarding, a forwarding table (FT) 220 is employed for discovering the RPF interface 216 and the oif 208 for the multicast packet, whether there is physically one table, two separate tables, one for the RPF and one for the replication operation, or even more tables is immaterial as any configuration may be employed. How the forwarding table 220 is populated is the responsibility of control and management procedures 214.

The control procedures (214) and relevant multicast control protocols in block 222 carry to the various routers information about which paths include listeners for which multicast groups. Management procedures (214) and the relevant management protocols in block 222 may influence when and how multicast routing information gathered by the control protocols updates the contents of the forwarding table. According to one embodiment, the router management 214 may pass to the forwarding engine 220, information that identifies which multicast addresses are thematically linked. In this case, the forwarding engine 212 in the router 202 can aggregate its forwarding state for these multicast groups.

Figure 6:
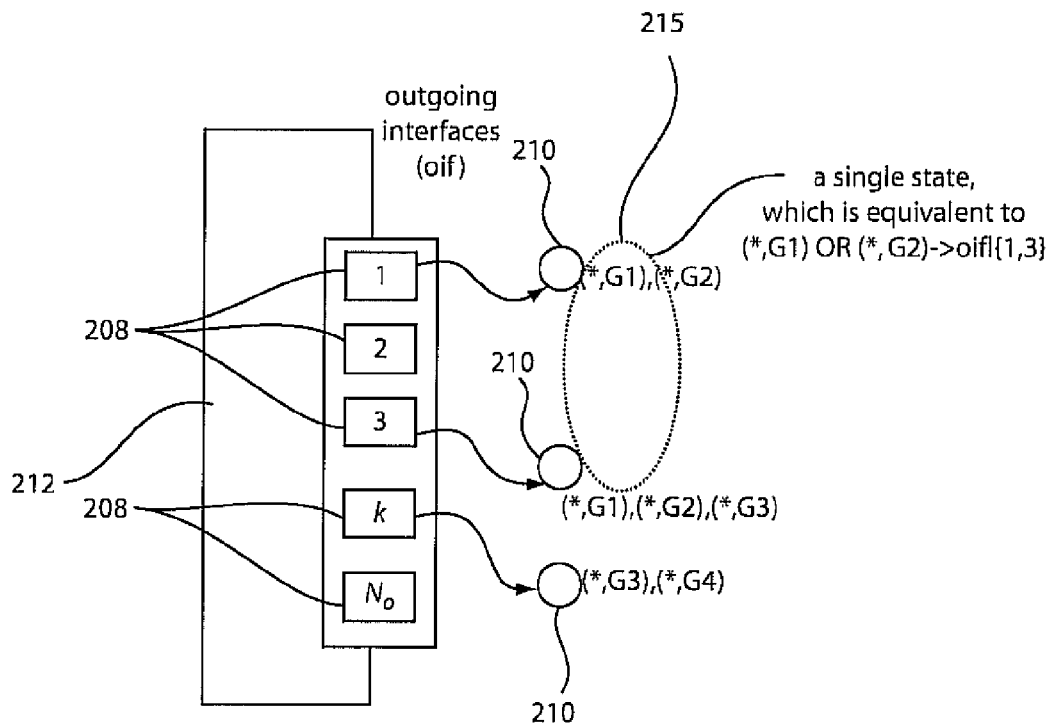
FIG. 6 is a block diagram showing a portion of the routing element of FIG. 5 after multicast flows are thematically linked in accordance with an illustrative embodiment.

Referring to FIG. 6, an example of state aggregation, where groups {(*,G1), (*,G2), (*,G3), (*,G4)} are thematically linked is illustratively presented. All (*,G1) through (*,G4) have a thematic relationship (e.g., are part of the same multimedia content), but only (*,G1), (*,G2) use simultaneously outgoing interfaces 1 and 3, hence only those two are "aggregated" in the forwarding table not, (*,G3), and (*,G4), which are represented as usual. FIG. 6 shows which multicast groups use which outgoing interfaces, thus, e.g., interface k carries traffic for groups (*,G3), and (*,G4). In this example not all the thematically linked groups are transmitted though the same oifs 208, which is a case similar to the one in FIG. 4 where the router may reside closer to the listeners rather than the source.

Since, groups (*, G1) and (*, G2) are thematically related (e.g., as told by a control/management procedure 214 (FIG. 5)), the forwarding states relating to these two groups can be aggregated in a single state 215 to what can be considered as the equivalent of an OR operation; if {(*,G1)_OR_(*,G2)} then replicate and transmit through oifl {1,3}. (*, G3) and (*, G4) are represented as usual and can be sent in addition to or instead of the thematically linked states.

Figure 7:
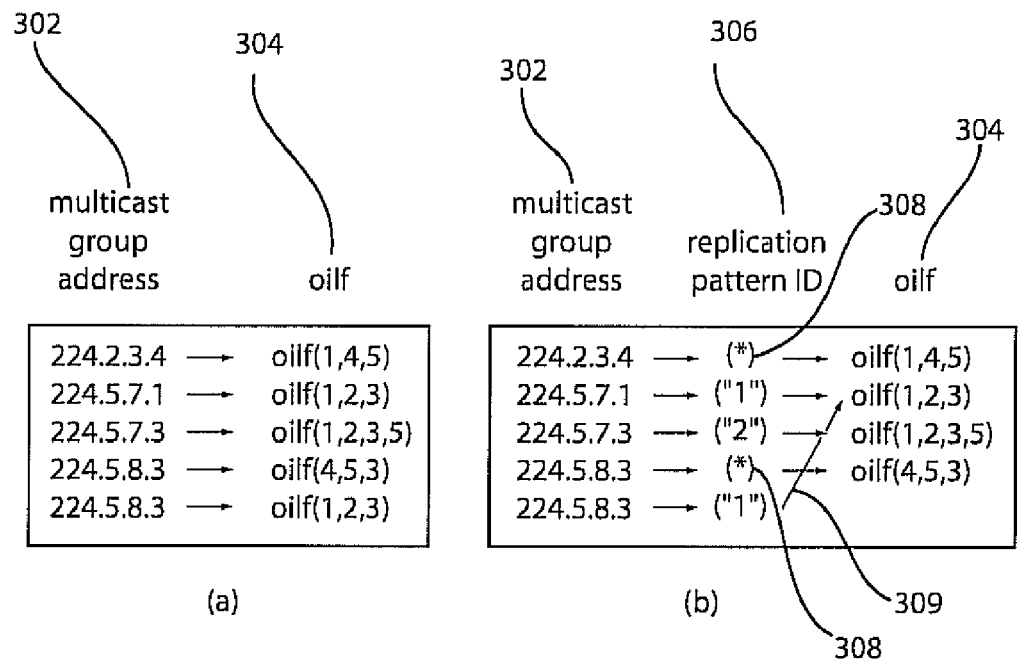
FIG. 7 is a diagram comparing forwarding table entries for a prior art system and a system in accordance with the present principles.

Referring to FIG. 7, a framework of embodiments for an illustrative implementation is shown. FIG. 7 compares a forwarding table look-up typically used in accordance with the prior art in section (a). Embodiments in accordance with present principles are depicted in section (b).

Section (a) shows a typical forward table look-up where a multicast group address 302 serves directly as the "key" for the look-up of an oifl 304. The multicast group address "key" points to a unique entry in the forwarding table that corresponds to the specific multicast group address.

In accordance with present principles, thematically-linked or path-related multicast groups may be represented by a member of the group directly (e.g., via a single multicast group address) or through a pointer 309 shown in FIG. 7 from the replication pattern ID 306. The replication pattern ID 306 points to the specific list of oifs 304 that all the multicast groups linked through the replication pattern ID 306 can use. There is a "pass-through" pointer 308, shown with a "*" in FIG. 7, that represents cases where the regular table look-up (section (a)) can be performed.

In this particular embodiment, all the replication patterns can be ordered in some fashion and aggregation is performed by eliminating multiple replication patterns, e.g., repetitions of the same example oifls 304. The replication pattern ID 306 is then used to index the resulting list of replication patterns. For those replication patterns where no duplicate is present, the default pass-through pointer 308 can be assigned.

With the framework embodiment in FIG. 7, the forwarding state needed in accordance with present principles is never worse than the typical table look-up (which becomes equivalent to using the default pass-through replication pattern ID 306 for all multicast groups). However, whenever path-related multicast groups are present the forwarding state is reduced and simplified by aggregation. If a multicast group does not use the pass-through option, the table look-up will be restricted to a smaller space of replication pattern IDs which then is immediately mapped to a unique oifl.

Note that the intermediary step involving the replication pattern ID 306 is preferably a logical one and does not necessarily have to be explicitly carried out. For example, if a multicast address of multicast groups that are thematically linked are assigned in a well-known sequence (or from some predefined, well-known set), then the mapping to a replication pattern ID 306 is implicit and the representative address for this set of multicast groups can serve as the default replication pattern ID 306.

A person skilled in the art may notice that one embodiment of the procedure for assigning multicast groups to a common theme, does not necessarily use an external control protocol. The assignment can be performed by observing the oifls that the multicast groups use, and therefore this may serve as a locally administered assignment of multicast groups to a theme that links these groups.

In a "legacy" respecting embodiment, the aforementioned procedures can occur entirely within a router. Respecting the legacy implementations means that the present embodiment do not require any changes in the normal operation of the network. Existing Internet protocols continue to function as they normally do. The structure of forwarding engines (212) (or at least the forwarding tables) may be modified, but even that can occur gradually and different routers with "upgraded" or "legacy" forwarding engines can interoperate in the network.

In another embodiment covering non-legacy networks, e.g., a brand new network installation comprising "brand new" and possibly non-standard compliant networking elements may be employed. The replication pattern ID 306 (or a set of parameters that relates to it) can be exchanged via inter-router control protocols. This will pass the thematic linkage of multicast groups among the routers simplifying the process by which routers identify group linkages. For example, a multicast control protocol can be constructed where instead of communicating information about multicast groups between routers as is typically done today, the relation with a theme can be communicated instead. This permits not only the aggregation of state in the routers but the aggregation and reduction of the control information flowing between routers as well.

Figure 8:
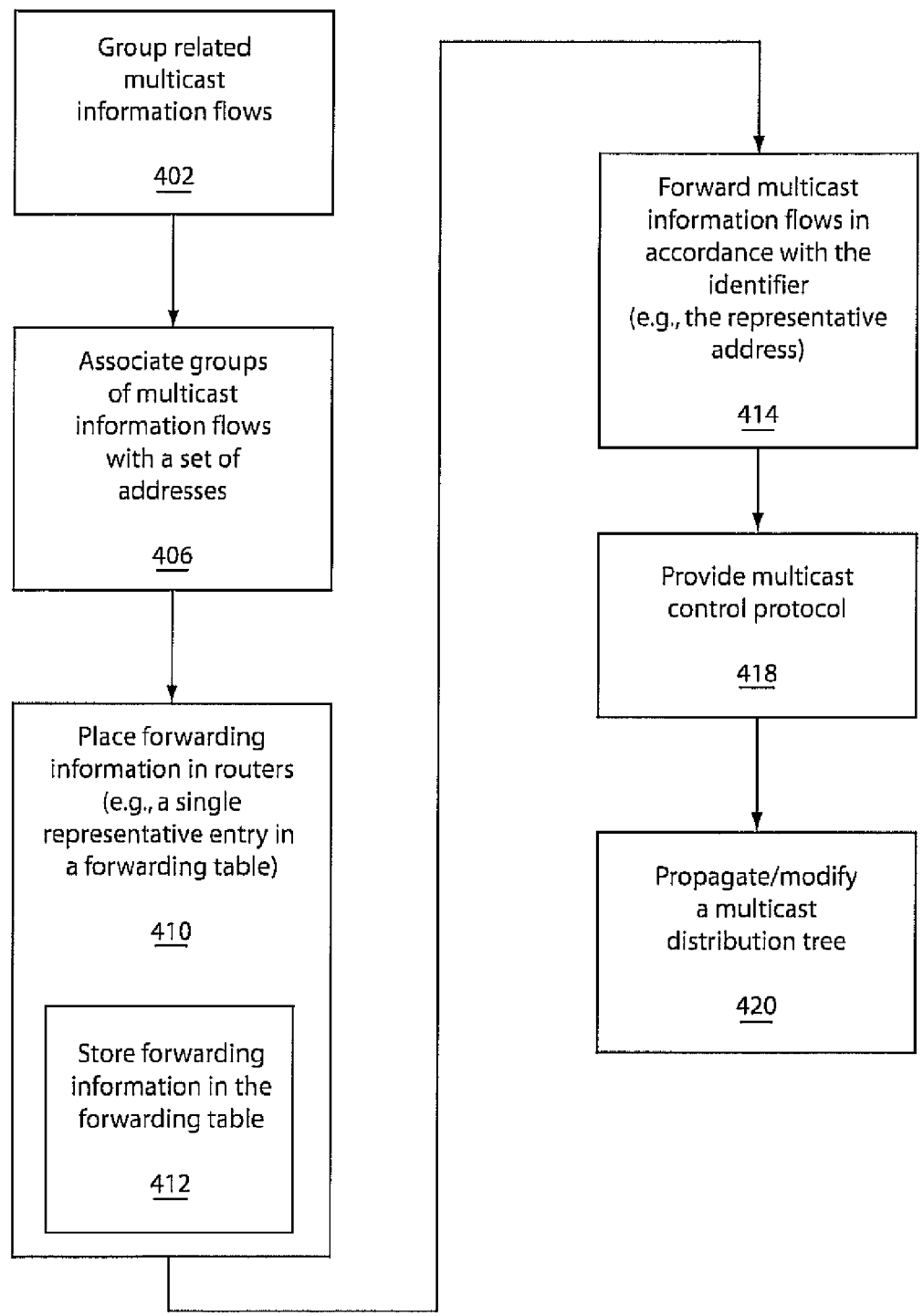
FIG. 8 is a block/flow diagram showing a system/method for forwarding multicast traffic in a network in accordance with present principles.

Referring to FIG. 8, a system/method for forwarding multicast traffic in a network is illustratively depicted. In block 402, a collection of path-related multicast information flows from a source are grouped. Grouping a collection of path-related multicast information flows from a source may include grouping the collection based on a content-based property.

In block 406, each information flow of the collection is associated with a multicast address from a set of multicast addresses. The set of addresses may include a range of addresses comprising a reserved sequence of addresses. The set of addresses may be identified by a pointer.

In block 410, forwarding information is placed in routers within the network between the sources and destinations, wherein the forwarding information includes a single entry in a forwarding table using an identifier, e.g., a representative address, for the collection. In block 412, the forwarding information is stored in a forwarding table in the routers.

In block 414, multicast information flows in the collection are forwarded using the forwarding information identified by the identifier, e.g., the representative address.

In block 418, a multicast control protocol is provided which is configured to communicate thematic linkage information to a control module which combines distinct lists of output interfaces which are to receive a multicast flow of flows. In block 420, the multicast control protocols propagate multicast distribution tree management information including joining and pruning information to alter portions of the tree for all the multicast groups that are thematically linked. The control protocols may be controlled externally to the router.

Having described preferred embodiments forwarding groups of multicast flows (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A routing element for a communications network, comprising:
a forwarding table comprising:
a collection of distinct lists of outgoing router interfaces used by one or more of a plurality of multicast groups transmitting through the routing element,
grouping information employed to combine two or more of the distinct lists to concurrently provide a multicast flow to the outgoing router interfaces on the two or more of the distinct lists;
a pass-through identifier to indicate that a multicast group is not linked to other distinct lists; and
a replication element configured to map the multicast flow in accordance with the grouping information.

2. The routing element as recited in claim 1, further comprising a reverse path forwarding (RPF) module to check incoming packets.

3. The routing element as recited in claim 1, further comprising a control module configured to combine two or more of the distinct lists to provide a multicast flow to the outgoing router interfaces on the two or more of the distinct lists.

4. The routing element as recited in claim 3, wherein the two or more of the distinct lists are combined in accordance with criteria externally supplied to the control module.

5. The routing element as recited in claim 1, wherein the two or more of the distinct lists which are grouped are identified by a single identifier.

6. The routing element as recited in claim 1, wherein the two or more of the distinct lists are grouped based upon a content-based property.

7. The routing element as recited in claim 1, further comprising a replication pattern identifier field in the forwarding table wherein the two or more of the distinct lists are linked using a same replication pattern identifier indicated in the field.

8. The routing element as recited in claim 7, wherein the pass-through identifier is placed in the replication pattern identifier field.

9. The routing element as recited in claim 1, wherein the multicast flows includes multicast transmissions.

10. The routing element as recited in claim 1, further comprising a multicast control protocol configured to communicate thematic linkage information to a control module which combines the two or more distinct lists.

11. The routing element as recited in claim 10, wherein the multicast control protocols propagate multicast distribution tree management information (join, prune) for all the multicast groups that are thematically linked.

12. The routing element as recited in claim 1, wherein the router interfaces are physical interfaces.

* * * * *